(12) United States Patent
Förster

(10) Patent No.: US 7,730,848 B2
(45) Date of Patent: Jun. 8, 2010

(54) INDICATOR APPARATUS

(75) Inventor: Axel Förster, Mannheim (DE)

(73) Assignee: VDO Automotive AG, Regensburg (DE)

( * ) Notice: Subject to any disclaimer, the term of this patent is extended or adjusted under 35 U.S.C. 154(b) by 0 days.

(21) Appl. No.: 11/992,819

(22) PCT Filed: Sep. 21, 2006

(86) PCT No.: PCT/EP2006/066561

§ 371 (c)(1),
(2), (4) Date: Mar. 27, 2008

(87) PCT Pub. No.: WO2007/036474

PCT Pub. Date: Apr. 5, 2007

(65) Prior Publication Data

US 2009/0056617 A1  Mar. 5, 2009

(30) Foreign Application Priority Data

Sep. 29, 2005  (DE) .................. 10 2005 046 714

(51) Int. Cl.
G01D 11/16 (2006.01)
G01D 13/22 (2006.01)

(52) U.S. Cl. .................. 116/297; 116/284; 116/332; 116/DIG. 6

(58) Field of Classification Search .................. 116/284, 116/286–289, 294, 296–298, 303, 305, 327, 116/328, 332, 62.1, 62.3, 62.4, DIG. 6, DIG. 36; 368/77, 221, 233

See application file for complete search history.

(56) References Cited

U.S. PATENT DOCUMENTS 2,287,554 A * 6/1942 Hansen .................. 116/62.3
2,408,042 A * 9/1946 Butler .................. 116/254
2,440,522 A * 4/1948 Ost .................. 116/291

(Continued)

FOREIGN PATENT DOCUMENTS

DE   195 36 887 A1   4/1997

(Continued)

OTHER PUBLICATIONS

Search Report dated Dec. 22, 2006 for underlying International PCT Application No. PCT/EP2006/066561.

(Continued)

Primary Examiner—Amy Cohen Johnson
(74) Attorney, Agent, or Firm—Cohen Pontani Lieberman & Pavane LLP

(57) ABSTRACT

The invention relates to an indicator apparatus (1) having a ring pointer (2), which is mounted such that it can move in the circumferential direction (5), and having a drive unit (3), which drives the ring pointer (2) in the circumferential direction (5), wherein the ring pointer (2) interacts with a stop (10) in a manner limited in terms of its circumferential movement. Particularly in the case of synchronization, radial disengagement often occurs in conventional ring pointer arrangements, and the aim of the invention is to prevent this. In order to solve the problem, the invention proposes arranging the stop (10) directly next to the drive unit (3). The critical advantage of this is that the tangential force on the ring pointer (2) from the drive unit generates an only small disengagement moment on the ring pointer (2).

7 Claims, 1 Drawing Sheet

U.S. PATENT DOCUMENTS

| | | |
|---|---|---|
| 6,062,063 A | 5/2000 | Robson |
| 6,351,435 B1 | 2/2002 | Kronenberg et al. |
| 6,408,783 B1 | 6/2002 | Ludewig |
| 6,484,663 B2 | 11/2002 | Zech et al. |
| 7,370,603 B2 * | 5/2008 | Balsfulland et al. ......... 116/288 |
| 7,427,143 B1 * | 9/2008 | Coon ........................ 362/29 |
| 7,434,536 B2 * | 10/2008 | Suess et al. ................. 116/298 |
| 2007/0040697 A1 | 2/2007 | Süess et al. |

FOREIGN PATENT DOCUMENTS

| | | |
|---|---|---|
| DE | 197 39 037 A1 | 3/1999 |
| DE | 198 60 266 A1 | 7/2000 |
| DE | 199 16 221 A1 | 7/2000 |
| DE | 103 31 443 A1 | 2/2005 |
| EP | 0 997 338 A2 | 5/2000 |
| EP | 1 031 818 A2 | 8/2000 |
| WO | WO 2005/005931 | 1/2005 |

OTHER PUBLICATIONS

Office Action dated Apr. 6, 2006 from German Patent Office for corresponding Germany Application No. 10 2005 046 714.8.

* cited by examiner

INDICATOR APPARATUS

CROSS REFERENCE TO RELATED APPLICATIONS

This is a U.S. national stage of application No. PCT/EP2006/066561, filed on Sep. 21, 2006. Priority is claimed on German application No. 10 2005 046 714.8, filed Sep. 29, 2005.

BACKGROUND OF THE INVENTION

The invention relates to an indicator apparatus having a ring pointer which is in the form of a ring or annular segment and is mounted so that it can move in the circumferentially. The indicator apparatus includes a drive unit which drives the ring pointer circumferentially, where the ring pointer has a stop face, and the indicator apparatus has a stop which interacts with the stop face so as to limit the circumferential movement of the ring pointer.

In the age of ever increasing information density in the cockpit of a motor vehicle, in particular manufacturers of combination instruments are faced with the difficult task of presenting a high density of information with, in some cases, safety related significance in a way which can be perceived satisfactorily. At the same times, it is also necessary to comply with relevant safety regulations which are intended to ensure a certain degree of precision, for example of the speed indicator, together with sufficient fail safety measures. In addition, this complex function must be provided with an attractive design, which frequently places strict limits on functionality and has a decisive influence on the requirements made of the overall structure.

In the compression of information, what are referred to as ring pointer, such as are described, for example, in EP 0 997 338, have proven expedient since these indicator devices do not require a central pointer axle. As a result, an analog indication in the classic sense is permitted, while at the same time leaving the central region of the indicator field free of the device's own components for a multifunction displays. Such a multifunction display may be composed, for example, of various small displays or of a relatively large graphic-compatible display.

Compared to conventional indicators with central indicator axes, the driving of the ring pointer, its bearing and its synchronization for a precise indication are much more complex. The usually circular ring pointer must be relatively dimensionally stable, despite its usually filigree embodiment so that it does not deform too much under the force of the drive. In addition, the ring pointer has to be mounted at a plurality of points over its circumference, and in this context the arrangement of three radial bearings over the circumference has proven expedient.

So that, for example, a speed indicator satisfies the high indication precision, a high power drive unit is provided which, for example in the case of severe braking, gives the ring pointer sufficient acceleration. In this context, the high tangential forces on the ring pointer can bring about an undesired radial offset, which not only adversely affects the indication precision for the moment of the offset but also desynchronizes the pointer. In the worst case, the drive unit is permanently no longer in engagement with the ring pointer because of the displacement of the ring pointer. In order to prevent this, previous embodiments have proposed radial stops which limit the possible radial offset of the ring pointer. However, fabricating these stops in a way which corresponds to the geometry of the filigree ring pointer requires extremely high fabrication precision, as a result of which considerable costs are incurred.

SUMMARY OF THE INVENTION

In view of the problems and disadvantages of the prior art, it is therefore an object of the invention to provide an indicator apparatus such that, in the case of high power drive, a radial offset of the ring pointer is eliminated, in particular in the case of synchronization by providing movement against a zero stop.

These and other objects and advantages are achieved by arranging the stop directly next to the drive unit.

The decisive advantage of the arrangement of the stop in accordance with the invention is that the tangential force from the drive unit acting on the ring pointer when the ring pointer is moved in the circumferential direction against the stop for the purpose of synchronization produces only a very small displacement moment on the ring pointer, due to the small distance between the stop and the drive unit. The negligibly small displacement moment does not lead to any significant radial offset so that radial stops which limit the radial offset can be omitted from the indicator apparatus.

Although the arrangement of the stop in close proximity to the drive unit is appropriate, it has become apparent that the distance between the stop and the force application point of the drive unit on the ring pointer can be up to a quarter of the maximum ring diameter. The distance of the stop from the force application point of the drive unit with respect to the actual center of rotation of the ring pointer can be up to 45°, defined as an angle of the circumference.

An embodiment of the indicator apparatus in which the drive unit has an output gear and the ring pointer is provided with a toothing which extends in the circumferential direction and is in engagement with the output gear is particularly expedient. This toothing can expediently point outwards such that the inner region of the ring pointer is free of the drive unit and is available for other indicator apparatuses.

In order to avoid excessive noise being generated at times when the ring pointer is being driven quickly, in particular gears which are damped by elastic elements or coated contact faces on the toothings or gearwheels are expedient.

The advantages according to the invention are particularly effective in an arrangement in which the indicator apparatus has a controller of the drive unit which is embodied such that the drive unit moves the stop face against the stop for the purpose of synchronization. During this process, the maximum possible forces, and therefore also the maximum displacement moments for the ring pointer are produced.

Excellent readability is obtained if the ring pointer has a pointer lug which extends radially. In this way, the viewer is provided with the accustomed ergonomic impression of a classic pointer instrument. A maximum degree of stability and precision is obtained if the ring pointer is mounted at three points along the circumference in a radial direction in each case by use of a radial bearing. In order to facilitate assembly, one of the radial bearings can be embodied in a sprung manner so that it is elastically resilient in the radial direction.

The ring pointer expediently has a pointing element or a pointer lug and a base element which bears the pointing element and which is mounted in a decentralized fashion. Here, the base element is preferably annular. As a result of the off-center bearing, it is thus possible to dispense with a central pointer shaft or axle and nevertheless achieve the customary circular movement of the pointer. The central region which is enclosed by the movement path of the pointer can easily accommodate large displays such as, for example, LCD displays. At the same time, the drive unit of the pointer can advantageously be arranged next to the base element, as a result of which a flat design can be achieved. In this context the bearing can be arranged in a common plane with the plane of the pointer or of the base element, as a result of which a tilting moment is avoided and the sensitivity to oscillations can be reduced. The base element can in this context additionally have a central guide which does not penetrate the plane of a dial or the display. It is particularly favorable here to provide a mount using three bearing points or radial bearings distributed approximately uniformly over the circumference of the base element. As a result, precise guidance of the base element can be achieved. These bearing points can, for example, also be prestressed with respect to the support body in order to compensate for possible tolerances. Here, it is also advantageous if one of the three radial bearings is simultaneously connected to the drive unit. As a result, one bearing point can be dispensed with because the drive unit simultaneously assumes the function of a bearing point. As a result, manufacturing expenditures and the necessary installation space can be reduced.

In another embodiment, the radial bearings can also be axial bearings. In this context, a profile which is embodied in a U shape is particularly appropriate for these bearing elements which are preferably small wheels, with the result that in the region of the bearing element the ring pointer is surrounded by it.

The movement of the ring pointer may be driven in a frictionally locking fashion, for example, by a prestressed friction wheel, or in a positively locking fashion. The latter is sufficient with a toothing with particularly high indication precision. It is favorable in this context if the pointer drive has a gear which engages in a toothing of the base element. The drive unit can be arranged directly on the outside of the base element, in which case both can, in particular, also be arranged in a common plane if the drive unit engages on the circumference of the support body. The drive unit can advantageously be arranged in a way which is invisible to the viewer.

In an embodiment, the base element is expediently provided with a central opening which permits an unimpeded view of an additional display located behind. An essentially flat disk shape of the base element is particularly compact.

The base element can to a large extent execute any desired movement path which may be, for example, ellipsoidal, in order in this way to emphasize visually specific pointer settings. It is particularly appropriate to have a circular shape of the base element, because the viewer is familiar with this. In a preferred embodiment, the base element is circular.

BRIEF DESCRIPTION OF THE DRAWINGS

The invention is described below by means of a specific exemplary embodiment and with reference to a drawing without a restrictive effect to said embodiment. In said drawing.

DETAILED DESCRIPTION OF THE PRESENTLY PREFERRED EMBODIMENTS

Figure 1:
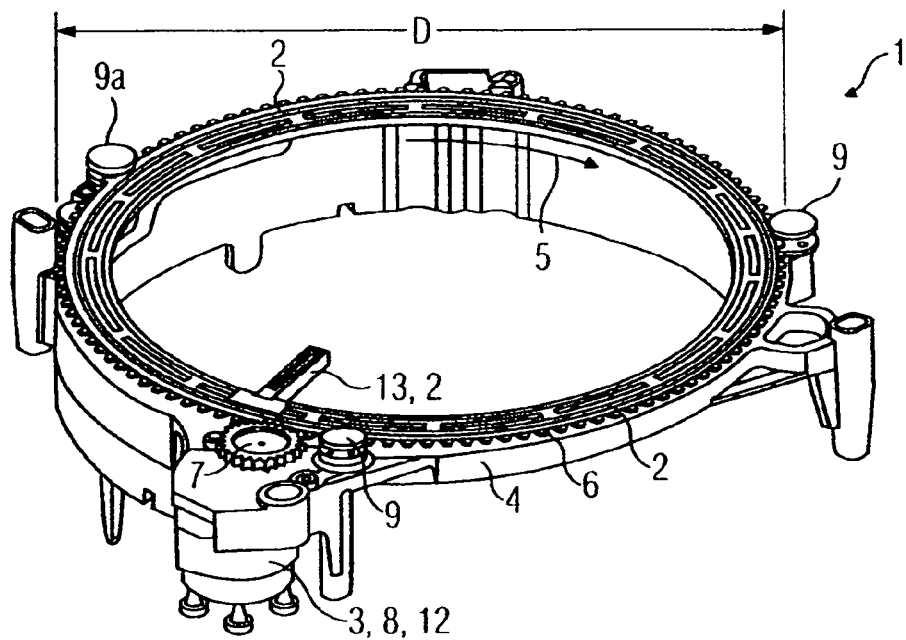
FIG. 1 is a perspective view of a ring pointer with a drive unit and bearings.
Figure 2:
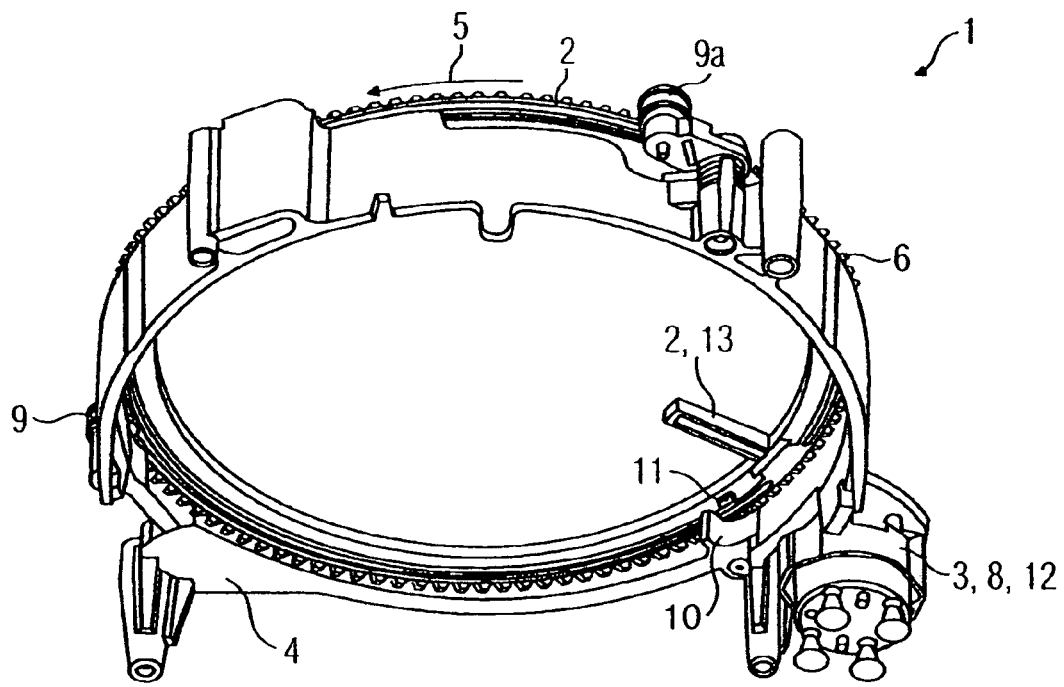
FIG. 2 is a perspective view of the ring pointer from FIG. 1, from the other side.

FIGS. 1 and 2 each illustrate an indicator apparatus 1 according to the invention, with an indication scale being omitted. The essential illustrated components are a ring pointer 2, a drive unit 3 and a carrier element 4. The ring pointer is provided on the outer diameter with a toothing 6 extending in the circumferential direction 5. The toothing 6 is connected to an output gear 7 of the drive unit 3 which has a stepping motor which ensures that the ring pointer 2 is driven in the circumferential direction or counter to the circumferential direction 5. The ring pointer 2 is mounted on the carrier element 4 by three radial bearings 9, 9a which each have a roller with a U-shaped end profile facing the carrier element, in which end profile the toothed outer circumference of the ring pointer is guided. The radial bearing 9a which is designated by 9a is embodied in a sprung manner, so that it is elastically resilient in the radially outer direction. In the direct vicinity of the drive unit 3, a stop 10, which limits the movement of the ring pointer 2 in the circumferential direction 5, is arranged on the carrier element 4. The ring pointer 2 has, corresponding to the stop face 10, a stop face 11 which comes to bear against the stop 10 in a zero position of the ring pointer. The ring pointer 2 also has a pointer lug 13. A controller 12 of the stepping motor 8 is configured such that, for the purpose of synchronization, it moves the stop face 11 of the ring pointer 2 against the stop 10 to determine the zero position. In the exemplary embodiment, the stop face 11 is a component of the carrier element of the ring pointer 2 which points radially inward from the ring pointer 2. The stop 10 is arranged in the direct vicinity of the output gear 7, with the distance being less than a quarter of the maximum ring diameter D of the ring pointer 2.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An indicator apparatus, comprising:
   a ring pointer having a stop face, said ring pointer comprising one of a ring and annular segment and being movably mounted such that the ring pointer is movable in a circumferential direction relative to the indicator apparatus;
   a drive unit which drives the ring pointer in the circumferential direction relative to the indicator apparatus; and
   a stop arranged proximate the drive unit which interacts with the stop face to limit the circumferential movement of the ring pointer.

2. The indicator apparatus as claimed in claim 1, wherein a distance between the stop and a force application point of the drive unit on the ring pointer is smaller than a quarter of a maximum ring diameter.

3. The indicator apparatus as claimed in claim 1, wherein the drive unit includes an output gear, and the ring pointer is provided with a toothing which extends in the circumferential direction and engages the output gear.

4. The indicator apparatus as claimed in claim 1, further comprising:
   a controller of the drive unit, the controller being configured to control the drive unit such that the drive unit moves the stop face against the stop to synchronize the ring pointer relative to the indicator apparatus.

5. The indicator apparatus as claimed in claim 1, wherein the ring pointer includes a pointer lug.

6. The indicator apparatus as claimed in claim 1, wherein the ring pointer is radially mounted at three points by respective radial bearings along the circumferential direction.

7. The indicator apparatus as claimed in claim 6, wherein at least one of the radial bearings is elastically resilient in a radial direction.

\* \* \* \* \*